(12) United States Patent
Chung

(10) Patent No.: US 12,487,633 B2
(45) Date of Patent: Dec. 2, 2025

(54) DISPLAYS WITH MOVABLE INPUT/OUTPUT MODULES

(71) Applicant: Hewlett-Packard Development Company, L.P., Spring, TX (US)

(72) Inventor: Tien Liang Chung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 181 days.

(21) Appl. No.: 18/006,862

(22) PCT Filed: Jul. 28, 2020

(86) PCT No.: PCT/US2020/043837
§ 371 (c)(1),
(2) Date: Jan. 25, 2023

(87) PCT Pub. No.: WO2022/025865
PCT Pub. Date: Feb. 3, 2022

(65) Prior Publication Data
US 2023/0266791 A1    Aug. 24, 2023

(51) Int. Cl.
*G06F 1/16* (2006.01)
*H04N 5/64* (2006.01)

(52) U.S. Cl.
CPC ............. *G06F 1/1607* (2013.01); *H04N 5/64* (2013.01)

(58) Field of Classification Search
CPC .... G06F 1/1601; G06F 1/1613; G06F 1/1626; G06F 1/1632; G06F 1/1633; G06F 1/1684

USPC ............... 361/679.4, 679.41, 679.45
See application file for complete search history.

(56) References Cited

U.S. PATENT DOCUMENTS

| | | | | |
|---|---|---|---|---|
| 3,433,886 A | * | 3/1969 | Myers | H02G 3/185 220/3.7 |
| 5,336,099 A | * | 8/1994 | Aldous | G06F 1/1632 439/344 |
| 5,338,210 A | * | 8/1994 | Beckham | H01R 31/06 439/344 |
| 5,411,405 A | * | 5/1995 | McDaniels | H01R 31/005 439/946 |
| 5,667,395 A | * | 9/1997 | Okada | H01R 24/62 439/946 |
| 5,888,078 A | * | 3/1999 | Lecreux | E03F 5/022 439/131 |
| 5,971,777 A | * | 10/1999 | Garside | H01R 24/62 439/131 |
| 6,567,273 B1 | * | 5/2003 | Liu | H05K 5/0265 361/752 |

(Continued)

FOREIGN PATENT DOCUMENTS

| CN | 203535633 U | 4/2014 |
|---|---|---|
| CN | 105652976 A | 6/2016 |

(Continued)

*Primary Examiner* — Adrian S Wilson
(74) *Attorney, Agent, or Firm* — Quarles & Brady LLP

(57) ABSTRACT

Examples herein relate to displays with input/output (I/O) modules. For instance, in some examples a display can include a housing having a recessed compartment, the recessed compartment including an internal face that includes a slot which is to receive a coupling mechanism of an I/O module, when present, to movably couple the I/O module to the internal face.

21 Claims, 5 Drawing Sheets

(56) References Cited

U.S. PATENT DOCUMENTS

| | | | |
|---|---|---|---|
| 6,773,291 B1* | 8/2004 | Roth | H01R 13/60 |
| | | | 439/131 |
| 6,832,920 B2* | 12/2004 | Glad | H01R 25/006 |
| | | | 439/131 |
| 7,118,414 B2 | 10/2006 | Spears et al. | |
| 7,374,437 B2* | 5/2008 | Reid | H01R 27/02 |
| | | | 439/131 |
| 7,483,262 B2* | 1/2009 | Yin | G06F 1/1616 |
| | | | 361/679.01 |
| 7,959,449 B2 | 6/2011 | Tracy et al. | |
| 8,274,786 B2 | 9/2012 | Sapper et al. | |
| 2005/0157459 A1* | 7/2005 | Yin | G06F 1/1632 |
| | | | 361/679.02 |
| 2011/0216491 A1* | 9/2011 | Lian | G06F 1/181 |
| | | | 361/679.4 |
| 2011/0273632 A1* | 11/2011 | Casey | H04N 5/64 |
| | | | 348/839 |
| 2013/0034973 A1 | 2/2013 | Chang et al. | |
| 2013/0309894 A1 | 11/2013 | Geng et al. | |
| 2014/0009628 A1 | 1/2014 | Jang et al. | |

FOREIGN PATENT DOCUMENTS

| | | |
|---|---|---|
| CN | 105812691 A | 7/2016 |
| WO | 2011/140039 A1 | 11/2011 |

\* cited by examiner

DISPLAYS WITH MOVABLE INPUT/OUTPUT MODULES

BACKGROUND

A computing device (e.g., a laptop, a tablet, a mobile phone, etc.) can include a display. The display can display information (e.g., images, text, etc.) and/or permit interaction with the computing device. The display can be a touchscreen display or other type of display that can receive input from an input device.

Computing devices can include input/output (I/O) ports. Example of I/O ports include universal serial bus (USB) ports, audio jacks, card readers, power jacks, video graphics array (VGA), High-Definition Multimedia Interface (HDMI), register jack (RJ)s, among others. I/O ports can be used to support various peripheral devices that may be used in conjunction with the computing device, such as data drives, keyboards, mice, displays, and the like.

DETAILED DESCRIPTION

As mentioned, input/output (I/O) ports such as universal serial bus (USB) ports can be used to support various peripheral devices such as data drives, keyboards, mice, displays, and the like. Typically, computing devices comprise multiple such I/O ports to enable simultaneous use of multiple peripheral devices. However, as computing devices become smaller and smaller there is less physical space available for I/O ports. Moreover, I/O ports are often visible/exposed at all times to an environment surrounding the electronic device. Having I/O ports visible/exposed at all times (even when the I/O ports are not in use) may present security concerns, may make the I/O ports prone to being damaged, and/or may result in an unwanted aesthetic.

As such, the disclosure herein is directed to electronic devices that include displays with an I/O module. For instance, a display can include an I/O module having I/O ports. The I/O module can be selectively recessed or extended from a cavity of the display. In this way, an I/O port in the I/O module can be readily accessed when intended (e.g., when the I/O module is in an extended position), and yet the I/O port can otherwise be securely retained in the recessed compartment (e.g., when the I/O module is in a recessed position), as detailed herein, to enhanced an aesthetic of the electronic device.

Further, displays with an I/O module can have an increased total number of I/O ports and/or larger sized I/O ports compared to other approaches such as those that employ "pop-out" port arrays located in a base of a laptop (which can be crowded with other components such as a physical keyboard, a joystick, and/or a touchpad, etc.). Having an increased total number of I/O ports and/or larger I/O ports (e.g., a card reader) can be sought after for various application.

Moreover, the displays with I/O modules can be employed without any intervening components (e.g., such as hinges and/or pivot points). For instance, the I/O module can be coupled via a friction fit between respective coupling mechanisms of the I/O module to a display without any intervening components. The absence of intervening components can ease manufacture and/or enhance reliability of the electronic devices that include displays with I/O modules.

Figure 1:
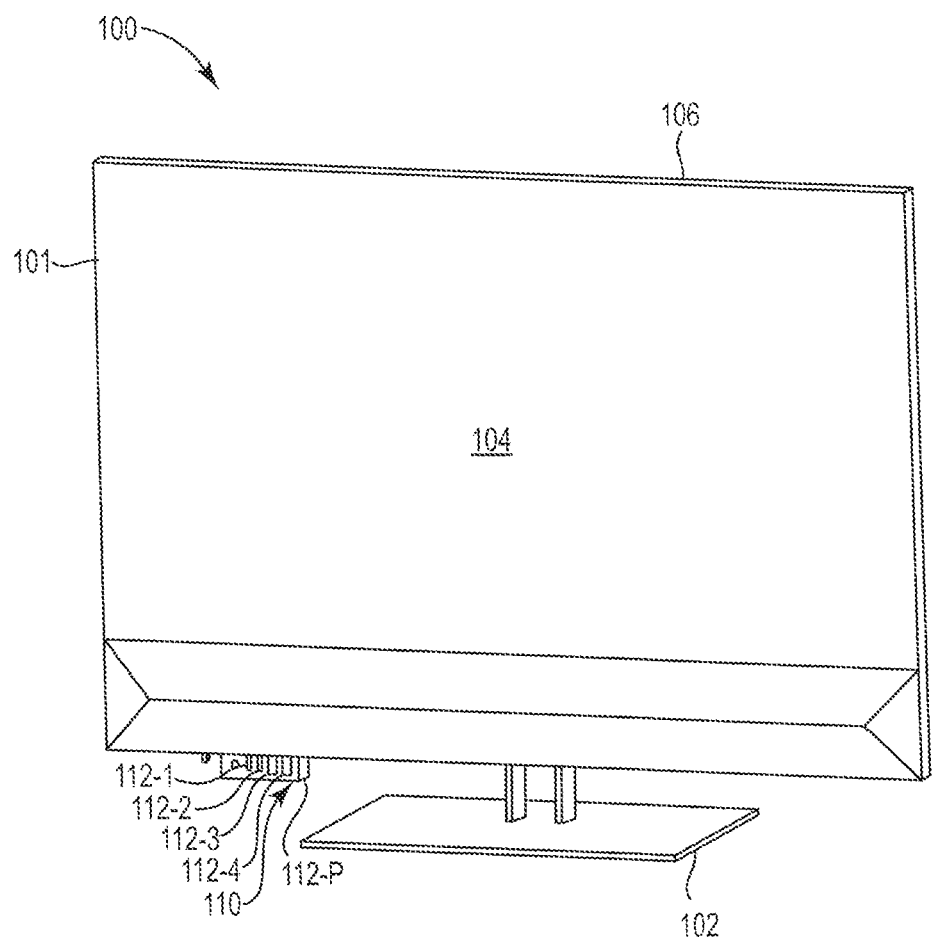
FIG. 1 is a view of an example electronic device including a display with an I/O module.

FIG. 1 is a view of an example electronic device 100 including a display 104 with an I/O module 110 (i.e., a movable I/O module). As used herein an I/O module refers to a device that includes an I/O port and can be movably coupled to an electronic device. For instance, as illustrated in FIG. 1, the I/O module 110 can include a plurality of I/O ports 112-1, 112-2, 112-3, 112-4, to 112-P (hereinafter referred to as I/O ports 112-1 to 112-P). The I/O ports 112-1 to 112-P can include universal serial bus (USB) ports, audio jacks, card readers, power jacks, video graphics array (VGA), High-Definition Multimedia Interface (HDMI), register jack (RJ)s, among other types of I/O ports.

In some examples, the I/O module 110 can include a plurality of frequently used I/O ports such as USB port, an audio jack, and/or a card reader. For instance, the I/O module 110 can include each of a USB port, an audio jack, and card reader. In some examples, the I/O ports 112-1 to 112-P can include a large I/O port. That is, the I/O module 110 can include large I/O ports such as a card reader (not illustrated). As used herein, a card reader refers to a data input device that can reads data from a card-shaped storage medium such as a credit card, membership card, etc.

In some examples, the I/O module 110 can include a total of one I/O port, two I/O ports, three I/O ports, four I/O ports, five I/O ports, six I/O ports and so forth up to a total of 20 I/O ports. That is, while FIG. 1 illustrates a given total number of I/O ports the total number of I/O ports included in the I/O module 110 can be varied, for instance, depending on a given application and/or size of the electronic device 100.

As illustrated in FIG. 1, each of the I/O ports 112-1 to 112-P can be oriented in a common direction. For instance, each of the I/O ports 112-1 to 112-P can be oriented in the I/O module 110 to face the front of the electronic device 100, as illustrated in FIG. 1.

The electronic device 100 can be a mobile phone, a wearable electronic device, a tablet, a laptop computer, a desktop computer, a display or monitor, or combinations thereof. In some examples, the electronic device 100 can be an all-in-one (AIO) computing device. As used herein, an AIO computing device refers to a computer which integrates the internal components into the same housing as the display and can offer a touch input functionality of the tablet devices while also providing a processing power and a viewing area of desktop computing systems.

The electronic device 100 can include a housing 101, the display 104, and a bezel 106. The housing 101 can form an exterior surface of the electronic device 100. The housing 101 can be formed of fabric, metal, natural materials such as wood, and/or plastic, among other suitable materials. While illustrated as including a unitary housing 101, it is understood that the housing 101 can include a plurality of sections such as a plurality of sections held together by a hinge or other coupling member (e.g., in the instance of a laptop).

As illustrated in FIG. 1, the housing 101 can be coupled to a stand 102. The stand refers to a physical device that extends from the housing 101 and/or a separate entity that can be coupled to the housing 101. The stand 102 can stabilize and/or elevate the electronic device 100 above a surface on which the electronic device 100 is disposed. While FIG. 1 illustrates the presence of the stand 102, in some examples the electronic device 100 can be without a stand. For instance, the electronic device 100 can be freestanding device (e.g., a laptop) without a stand.

The bezel 106 refers to a component that surrounds a periphery of an electronic display such as the display 104. The bezel 106 can be formed of a same or different material than a material forming other sections of the housing 101. For instance, the bezel 106 can be formed of fabric, metal, and/or plastic, among other suitable materials. In some examples, the I/O module can extend out of a recessed compartment that is located at least partially within the bezel 106 of the display 104.

The display 104 can include a graphical user interface and/or a liquid crystal display. The display 104 can include a touchscreen. A touchscreen refers to an input and/or output device layered on top of an electronic visual display (e.g., monitor) of a computing device to receive a touch input. The touchscreen can facilitate a user to interact directly with what is displayed (e.g., icons on a graphical user interface (GUI) displayed by the computing device, a virtual keyboard, GUI components of instructions executing on the computing device, pictures, videos, etc.).

Figure 3:
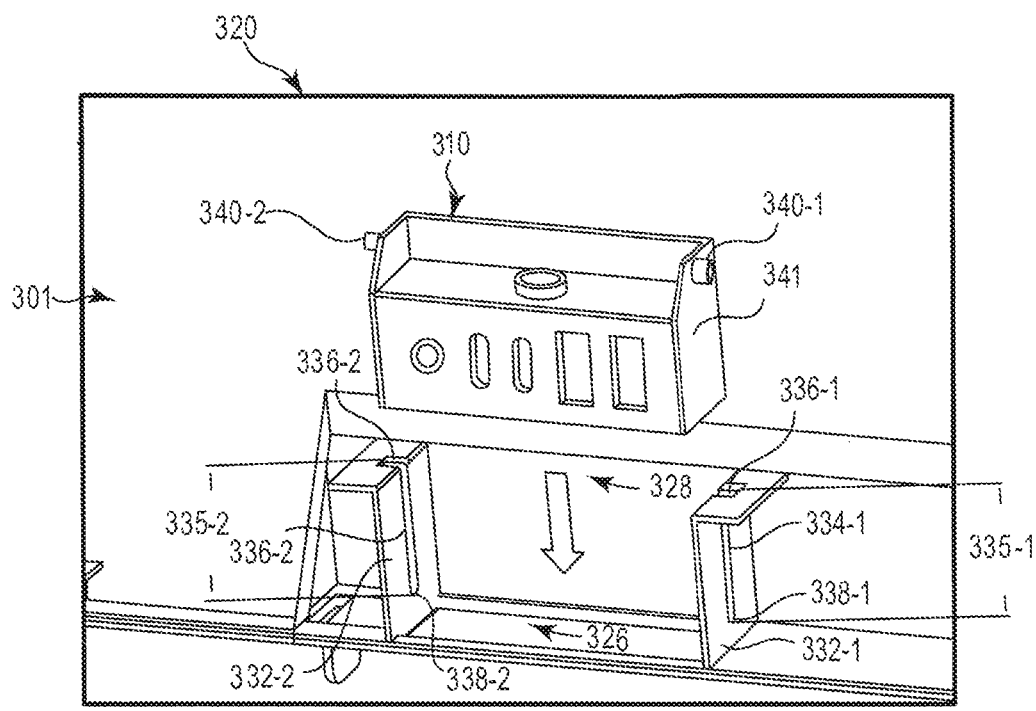
FIG. 3 is a portion of the back view of the electronic device.

As illustrated in FIG. 1, the I/O module 110 can be in an extended position. As used herein, an extended position refers to an I/O module being positioned a distance outside of the housing 101 to permit access to the I/O ports 112-1 to 112-P. However, as detailed herein, the I/O module 110 can be sized to be disposed in a recessed compartment (e.g., a recessed compartment 328 as illustrated in FIG. 3) of the electronic device, as detailed herein. As used herein, a recessed compartment refers to an internal volume defined by the housing 101 that is sized to receive and store an I/O module such as the I/O module 110. The recessed compartment can have a length, a width, and a height, that are each larger than a corresponding length, width, and height of the I/O module to permit the I/O module 110 to be stored in a recessed position in the recessed compartment (not illustrated in FIG. 1 for ease of illustration), as detailed herein.

Figure 2A:
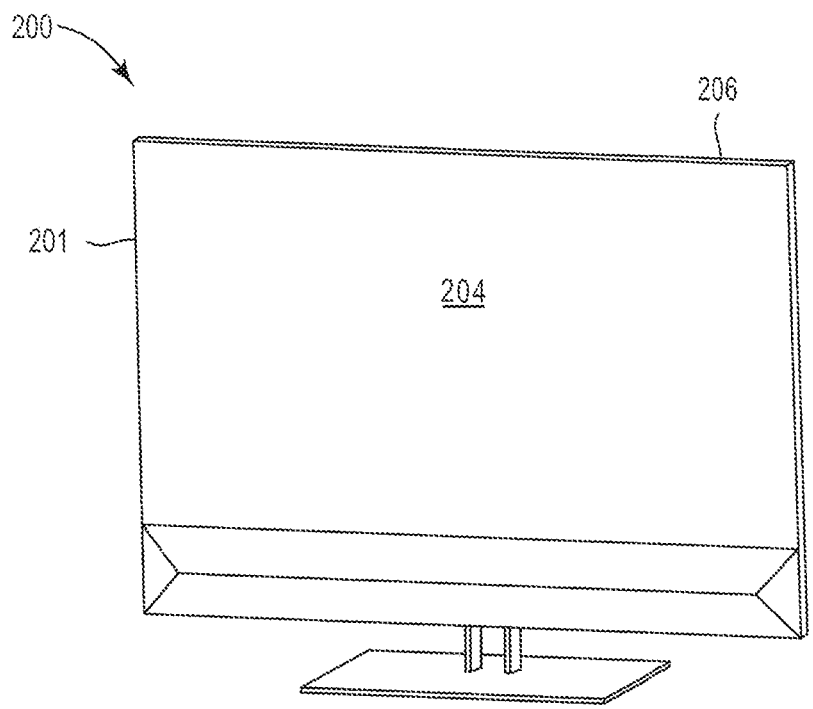
FIG. 2A is a front view of an example electronic device including a display with an I/O module in a recessed position.

FIG. 2A is a front view of an example electronic device 200 including a display 204 with an I/O module that is in a recessed position. As used herein, a recessed position refers to an I/O module (not illustrated in FIG. 2A) being positioned in a volume of a housing 201 such that the I/O ports in the I/O module are inaccessible and not visible from outside of the housing 201. For instance, the I/O module can be recessed in (e.g., entirely in) the housing 201 of the display 204 of the electronic device, as detailed herein. Thus, as illustrated in FIG. 2A the I/O module and/or the I/O ports in the I/O module are not visible in the front view of the electronic device 200.

Figure 2B:
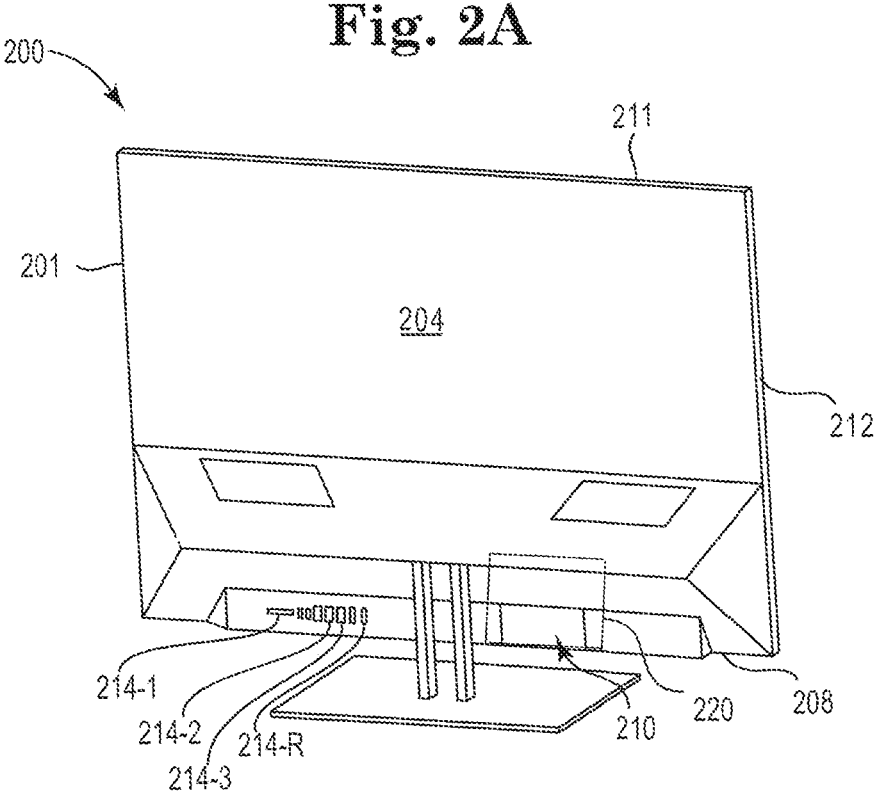
FIG. 2B is a back view of an example electronic device including a display with an I/O module that is in a recessed position.

FIG. 2B is a back view of an example electronic device 200 including a display 204 with an I/O module 210 that is in a recessed position. FIG. 2B illustrates the I/O module 210 is as being visible for descriptive purposes herein. However, it is understood that the I/O module 210 can be recessed in a portion (as represented by the rectangle with the element identifier 220) of the display 204 of the electronic device 200 and therefore would not be visible.

While the portion 220 (which includes the recessed compartment as detailed herein) is shown in/near a bottom surface 208 of the display 204 in FIG. 2B, the recessed compartment can be located elsewhere in the housing 201 of the display 204. For instance, the recessed compartment can be located in a top surface 211 (opposite the bottom surface 208) and/or in a side surface 212 (located between the top surface 211 and the bottom surface 208) of the display 204. Regardless of the particular location of the recessed compartment in the display, an I/O module can be movably coupled to a recessed compartment to permit motion of the I/O module between an extended position and a recessed position, as detailed herein.

As illustrated in FIG. 2B, the electronic device 200 can include I/O ports 214-1, 214-2, 214-3 to 214-R (hereinafter referred to as I/O ports 214-1 to 214-R). The I/O ports 214-1 to 214-R are exposed on the back of the electronic device 200, as illustrated in FIG. 2B. The I/O ports 214-1 to 214-R can include infrequently used I/O ports such as a power jack, VGA port, HDMI port, and/or an registered jack port (e.g., RJ45), etc. Having the infrequently used I/O ports located on the back of the electronic device 200 can permit frequently used I/O ports (e.g., USB port, an audio jack, and/or a card reader) to be located in the I/O module 210. Thus, frequently used I/O ports can be selective exposed and thereby accessible from the front of the electronic device 300 to promote ease of use of the frequently used I/O ports, while the infrequently used ports can be located on the back of the example electronic device 200.

FIG. 3 is a portion 320 of a back view of the electronic device (e.g. of the electronic device 200 as illustrated in FIG. 2B). As illustrated in FIG. 3, the portion 320 of the electronic device can include the recessed compartment 328 defined by the housing 301. As mentioned, the recessed compartment 328 can be sized to receive and store an I/O module such as I/O module 310, when the I/O module is present. While illustrated in FIG. 3 as being visible for descriptive purposes, it is understood that various components such as the recessed compartment 328 can be obscured from view by the housing 301 of the electronic device.

As illustrated in FIG. 3, the recessed compartment 328 can be rectangular. However, other shapes are possible. For instance, the recessed compartment 328 can be square, circular, or triangular shaped, among other possibilities. The shape/size of the recessed compartment 328 can depend for instance on a type/shape of the housing 301 of the display.

Moreover, while FIG. 3 illustrates an individual recessed compartment it is understood that a total number, shape, and/or location of the recessed compartment, among other items, can be varied. For instance, a display can include a plurality of recessed compartments (not illustrated in FIG. 3). The recessed compartments in the plurality of recessed compartments can be the same shape/size and/or can be different shapes/sized, for instance, to permit a variety of types of I/O ports to be located in respective I/O modules.

The recessed compartment 328 can include an internal face such as a first internal face 332-1 and a second internal face 332-2. The internal faces can be planar, as illustrated in FIG. 3, among other possibilities. In some examples, the first internal face 332-1 and the second internal face 332-2 can be parallel (e.g., parallel opposing faces).

The internal faces can include slots. For instance, the first internal face 332-1 can include a first slot 334-1. Similarly, the second internal face 332-2 can include a second slot 334-2. The first slot 334-1 and the second slot 334-2 can be sized to receive coupling mechanisms such as a first coupling mechanism 340-1 and a second coupling mechanism 340-2 of an I/O module 310 when the I/O module 310 is present.

The first coupling mechanism 340-1 and the second coupling mechanism 340-2 can be projections extending from a body 341 of the I/O module 310. The first coupling mechanism 340-1 and the second coupling mechanism 340-2 can permit the I/O module 310 to be movably coupled to the display 304. For instance, the I/O module 310 can be movable coupled, via the first coupling mechanism 3401-1 to the first internal face 332-1 and via the second coupling mechanism 340-2 to the second internal face 332-2, as illustrated in FIG. 3.

While FIG. 3 illustrates the presence of a total of two slots and a total of two coupling mechanisms that total number of slots and/or coupling mechanism can be varied. For instance, in some examples the recessed compartment can include an individual slot and an individual coupling mechanism rather than two slots and two coupling mechanisms, among other possibilities. Alternatively or in addition, while FIG. 3 illustrates slots (the first slot 334-1 and the second slot 334-2) present in the recessed compartment and a corresponding coupling mechanisms (e.g., the first coupling mechanisms 340-1 and the second coupling mechanisms 340-2) present in the I/O module, in some examples the slots can instead be present in the I/O module and the coupling mechanisms can instead be present in the recessed compartment.

Figure 4:
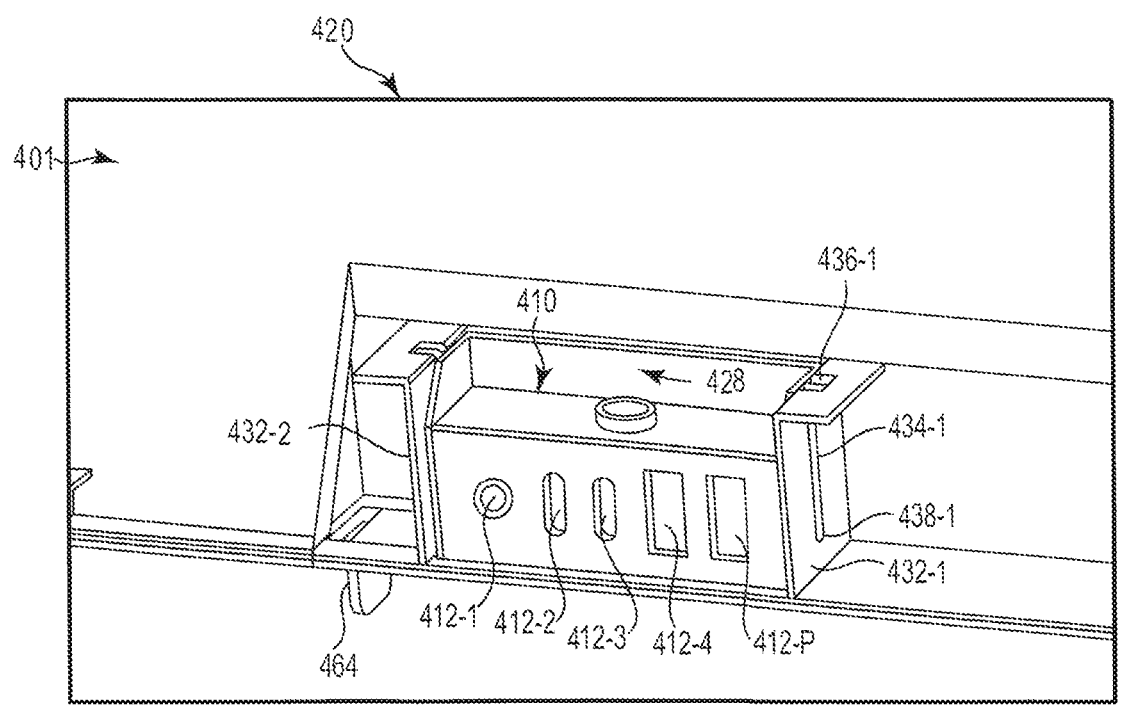
FIG. 4 is a portion of another back view of the electronic device.
Figure 5:
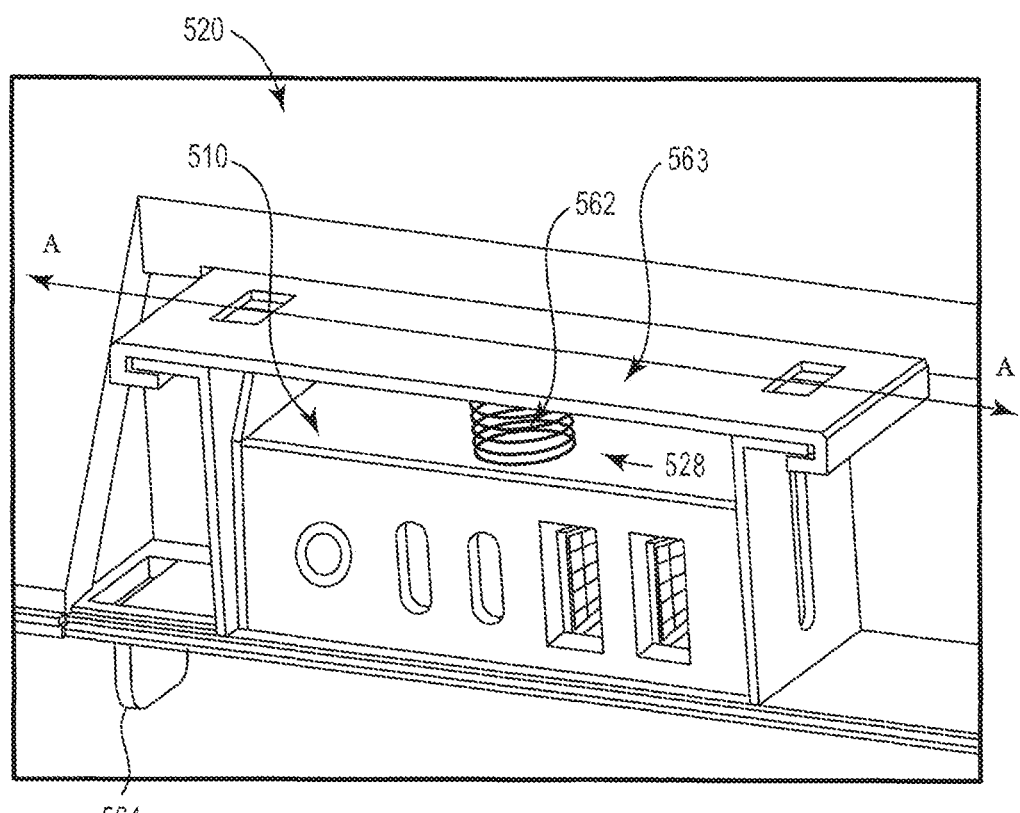
FIG. 5 is a portion of yet another back view of the electronic device.
Figure 6:
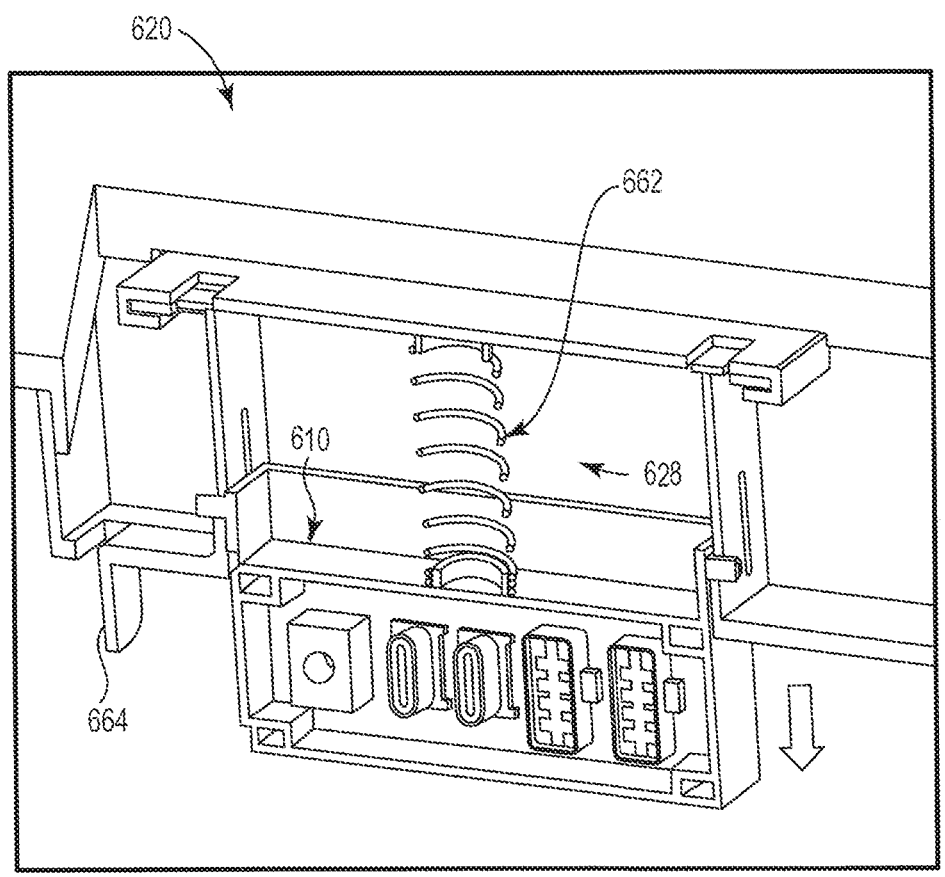
FIG. 6 is a cross-sectional view of the portion of the electronic device with an I/O module in an extended position.

As used herein being movably coupled refers to the presence of a mechanical connection (e.g., a friction fit) that interconnects two components and yet permits relative motion of the two components. For instance, the I/O module 310 can be moved relative the housing 301 and the recessed compartment 328. For instance, the I/O module 310 can be moved between a recessed position (e.g., as illustrated in FIGS. 4 and 5) and an extended position (e.g., as illustrated in FIG. 6).

In some examples, the recessed compartment 328 can include an elongated slot. For instance, the first slot 334-1 and the second slot 334-2 can be elongated slots, as illustrated in FIG. 3. As used herein an elongated slot refers to a physical feature which has a longer length than a width. For example, the first slot 334-1 can include a first distal portion 336-1 and a second distal portion 338-1 which are located at opposite ends along a length 335-1 of the first slot 334-1.

Similarly, the second slot 334-2 can include a first distal portion 336-2 and a second distal portion 338-2 which are located at opposite ends of the second slot 334-2 along a length 335-2 of the second slot 334-2. As illustrated in FIG. 3, the first distal portion 336-1 of the first slot 334-1 and the first distal portion 336-2 of the second slot 334-2 can be open and in communication with an internal volume of the housing 301 to permit the coupling mechanisms (340-1, 340-2) of the I/O module 310 to be inserted, via the first distal portions, into the first slot 334-1 and the second slot 334-2.

The length 335-1 and 335-2 can be equal or different. For instance, the length 335-1 can be equal to the length 335-2, as illustrated in FIG. 3. Having the lengths 335-1 and 335-2 be equal can promote aspects of displays with movable I/O modules such as easing movement of the I/O module between a recessed position and an extended position. However, in some examples length 335-1 and 335-2 can be different, for instance, depending on a type/shape of an I/O module and/or a type/shape of computing device/display.

As illustrated in FIG. 3, the first slot 334-1 can have an uninterrupted length 335-1 extending from the first distal portion 336-1 to the second distal portion 338-1 and the second slot 334-2 can have an uninterrupted length 335-2 extending from the first distal portion 336-2 to the second distal portion 338-2. As such, the first slot 334-1 and the second slot 334-2 can, by virtue of having the respective uninterrupted lengths, permit the I/O module 310 to linearly translate along the uninterrupted lengths of the first slot 334-1 and the second slot 334-2. For instance, the I/O module 310 can linearly translate between the first distal portions (336-1, 336-2) and the second distal portions (338-1, 338-2). For example, the I/O module 310 can linearly translate from a recessed position as illustrated in FIG. 3 through an opening 326 to an extended position (e.g., as detailed with respect to FIG. 6).

FIG. 4 is a portion 420 of another back view the electronic device. As illustrated in FIG. 4, the portion 420 can include a recessed compartment 428. The recessed compartment 428 can be sized to permit the I/O module 410 to be disposed in an internal volume of the recessed compartment 428, as illustrated in FIG. 4. In this manner, the I/O module can be maintained in a recessed position in the recessed compartment. For instance, a coupling mechanisms (not shown in FIG. 4) of the I/O module 410 can be located at first distal portions of the slots (e.g., a first distal portion 436-1) when the I/O module 410 is in a recessed position.

In some examples, a release mechanism 464 can be present to maintain the I/O module 410 in the recessed position and permit the I/O module 410 to be moved to an extended position. Examples of release mechanism include various mechanical release mechanisms such as a pins, tabs, among others. The release mechanism 464 can engage with the I/O module 410 directly or otherwise stop the I/O module 410 from extending through an opening (e.g., opening 326 as illustrated in FIG. 3) in the housing 401 when the I/O module 410 is in the recessed position.

Yet the release mechanism 464 can be moved, rotated, or otherwise altered to permit the I/O module 410 to move through the opening to an extended position, as described herein with respect to FIG. 6. For instance, the release mechanism 464 can be a tab that can contact the I/O module 410 or otherwise block the opening to retain the I/O module in the recessed position as illustrated in FIG. 4, and yet can be moved a distance away from the I/O module and/or the opening to permit the I/O module 410 to move through the opening to an extended position.

FIG. 5 is a portion of yet another back view of the electronic device. As illustrated in FIG. 5, a biasing member 562 can be included in a recessed compartment 528. Examples of suitable biasing members include springs, foam, and/or other components that can disposition an I/O module towards an extended position.

For instance, as illustrated in FIG. 5 the biasing member 562 can be a spring located between the I/O module 510 and a bracket 563. The biasing member 562 can be compressed when the I/O module 510 is in a recessed position, as illustrated in FIG. 5. The biasing member 562 can (e.g., due to being compressed) disposition the I/O module 510 to move from the recessed position (e.g., as illustrated in FIG. 5) to an extended position (e.g., as illustrated in FIG. 6). For instance, the biasing member 562 can cause the I/O module 510 to move from a recessed position to an extended position responsive to a change in a position of a release mechanism 564.

FIG. 6 is a cross-sectional view of the portion (e.g., a portion 620) of the electronic device of FIG. 5 (as viewed from cross-sectional line A in FIG. 5) in which an I/O module 610 is in an extended position. As illustrated in FIG. 6, a recessed compartment 628 can include a biasing member 662 to disposition the I/O module to an extended position. That is, the biasing member 662 can move or assist with moving the I/O module to an extended position at which the I/O module is extended from the recessed compartment, as illustrated in FIG. 6. For instance, a release mechanism 664 can be moved, rotated, or otherwise altered to permit the I/O module 610 to move (e.g., through an opening in the housing, as detailed herein) to the extended position as illustrated in FIG. 6.

The I/O module 610 (and the I/O ports therein) can be electrically coupled to the display via a wire or cable (not illustrated in FIG. 6). The wires or cables can have an orientation and/or length to permit movement of the I/O module between the recessed position and the extended position. In some examples, the cable can be a flexible cable that electrically couples that I/O module 610 to the display.

The figures herein follow a numbering convention in which the first digit corresponds to the drawing figure number and the remaining digits identify an element and component in the drawing. Similar elements or components between different figures may be identified by the use of similar digits. For example, 104 may reference element "04" in FIG. 1, and a similar element may be referenced as 204 in FIG. 2A.

Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

The above specification and examples provide a description of the method and applications and use of the system and method of the present disclosure. Since many examples can be made without departing from the scope of the system and method, this specification merely sets forth some of the many possible example configurations and implementations.

What is claimed is:

1. A device comprising:
   a housing having a recessed compartment;
   an input/output module movable, through an opening in the recessed compartment, from a recessed position to an extended position;
   a coupling mechanism to movably couple, by protruding into a slot, the input/output module to the recessed compartment;
   a release mechanism to block, in response to placement of the release mechanism in a first position, the opening to inhibit movement of the input/output module from the recessed position to the extended position; and
   a biasing member to move, in response to the placement of the release mechanism in a second position, the input/output module through the opening from the recessed position to the extended position.

2. The device of claim 1, wherein a friction fit between the coupling mechanism couples the input/output module to the housing.

3. The device of claim 1, wherein the recessed compartment is sized to permit the input/output module to be disposed in the recessed compartment.

4. The device of claim 1, wherein the input/output module is between the biasing member and the opening.

5. The device of claim 1, wherein the release mechanism is to permit, in response to the placement of the release mechanism in the second position, the movement of the input/output module through the opening from the recessed position to the extended position.

6. The device of claim 1, wherein the release mechanism is movable a distance away from the input/output module to permit the input/output module to move through the opening to the extended position.

7. The device of claim 1, wherein the release mechanism is movable a distance away from the opening to permit the input/output module to move through the opening to the extended position.

8. The device of claim 1, wherein the input/output module is movable, through the opening in the recessed compartment, from the recessed position to the extended position.

9. The device of claim 1, wherein a first internal face of the recessed compartment is in parallel with a second internal face of the recessed compartment.

10. The device of claim 1, wherein the coupling mechanism is in an internal face of the recessed compartment.

11. The device of claim 1, wherein the coupling mechanism is a projection extending from a body of the input/output module.

12. The device of claim 1, wherein the coupling mechanism is a projection extending from the recessed compartment.

13. The device of claim 1, wherein the input/output module comprises a plurality of input/output ports.

14. The device of claim 1, wherein the slot is in an internal face of the recessed compartment.

15. The device of claim 1, wherein the slot is an elongated slot including a first distal portion and a second distal portion.

16. The device of claim 15, wherein the coupling mechanism is insertable into the slot via the first distal portion.

17. The device of claim 15, wherein the first distal portion and the second distal portion are located at opposite ends of the slot along a length of the slot.

18. The device of claim 15, wherein the slot has an uninterrupted length extending from the first distal portion to the second distal portion.

19. The device of claim 15, wherein the second distal portion is between the first distal portion and the opening.

20. The device of claim 15, wherein the input/output module is to linearly translate between the first distal portion and the second distal portion.

21. The device of claim 15, wherein the first distal portion is open and in communication with an internal volume of the housing.

* * * * *